United States Patent
Koehn et al.

(10) Patent No.: US 8,632,027 B2
(45) Date of Patent: *Jan. 21, 2014

(54) SCRAPING, HAULING AND COMPACTING MACHINE

(71) Applicants: Kevin V. Koehn, Mayfield, KY (US); Rusty L. Schmidt, Wingo, KY (US)

(72) Inventors: Kevin V. Koehn, Mayfield, KY (US); Rusty L. Schmidt, Wingo, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,435

(22) Filed: Nov. 30, 2012

(65) Prior Publication Data

US 2013/0183125 A1 Jul. 18, 2013

(51) Int. Cl.
*B02C 21/02* (2006.01)
(52) U.S. Cl.
USPC .................................................. 241/101.763
(58) Field of Classification Search
USPC .................................... 241/101.763, 101.742
See application file for complete search history.

(56) References Cited

U.S. PATENT DOCUMENTS

| | | | |
|---|---|---|---|
| 3,599,785 A | 8/1971 | Stuart | |
| 3,774,754 A | 11/1973 | Hedlund | |
| 3,881,707 A | 5/1975 | Toto | |
| 4,711,403 A | 12/1987 | Gregory et al. | |
| 4,897,183 A | 1/1990 | Lewis | |
| 5,297,745 A | 3/1994 | Vinyard | |
| 5,806,685 A | 9/1998 | Lastinger | |
| 5,901,685 A | 5/1999 | Noyce et al. | |
| 6,000,647 A | 12/1999 | Hardy | |
| 6,092,668 A | 7/2000 | Lewis et al. | |
| 7,401,657 B2 | 7/2008 | Huber | |
| 8,302,891 B2 * | 11/2012 | Koehn et al. ............. | 241/30 |
| 2006/0081385 A1 | 4/2006 | Huber | |

* cited by examiner

*Primary Examiner* — Mark Rosenbaum
(74) *Attorney, Agent, or Firm* — Carrithers Law Office PLLC

(57) ABSTRACT

A device for gathering and removing chicken litter from chicken houses and for compacting the litter onto a compost pile. The scraper, hauler and compacter cleans and levels the floor of a chicken house as the scraper is being pulled by a tow vehicle such as a small tractor. A tiltable container is filled with the litter as scraping is done. When the container is full, the apparatus is towed to a compost pile where the scraper is either backed onto the pile or can be pulled up onto the pile. The container is tilted and the tailgate is opened. The apparatus is configured such that the wheels are in the rear and when the container is tilted into an unloading position with the tailgate hanging down in front of the wheels, the tailgate levels the litter out as the apparatus is moved forward. The wheels compress the litter onto the compost pile. Therefore, emptying, leveling and compacting the litter are all accomplished in one fluid motion, leaving the compost pile level and ready to receive another load immediately.

19 Claims, 4 Drawing Sheets

SCRAPING, HAULING AND COMPACTING MACHINE

TECHNICAL FIELD

The present invention relates to the field devices used to collect and remove chicken litter from inside chicken houses and to deliver, spread and compact the litter on a compost pile.

BACKGROUND OF THE INVENTION

Poultry is one of the most nutritious and economical meats available to consumers. Chickens are more efficient converters of feed to meat as compared to cattle or hogs. A chicken farmer can complete a 'broiler' from a small chick to full grown broiler in seven weeks. So, the down time between the removal of a grown chickens and the bringing in of small chicks is very expensive. Therefore, barn cleanup time needs to be kept to a minimum.

With regulations concerning animal waists, the waist must be handled in an environmentally safe and efficient manor. Composting is seen as a good overall environmentally friendly solution.

U.S. Pat. No. 7,401,657 B2 by Huber for GROUND SCRAPER issued on Jul. 22, 2008 teaches a ground scraper which will level the ground and loosen compacted manure. Wheels are mounted on the rear of the unit and can be raised and lowered hydraulically to level the scraper box. A single blade can be raised and lowered hydraulically as well. The ground scraper can be pulled by a typical farm tractor. Huber teaches a device for breaking compacted manure free from the soil and leveling the soil. However, the manure cannot be loaded onto or carried away by the scraper or spread and compacted onto a compost pile.

U.S. Pat. No. 4,711,403 by Gregory et al. for METHOD AND APPARATUS FOR CLEANING CHICKEN MANURE FROM CHICKEN HOUSES which issued on Dec. 8, 1987 teaches a combination scraper, screener, elevator and dumpable trailer which is used to scrape up chicken litter and sift out reusable bedding material from the manure. The apparatus can be pulled by a typical farm tractor. The trailer bed is dumped hydraulically. The elevator is propelled hydraulically or by tractor supplied power take-off. Gregory's apparatus picks up, carries, and dumps manure, but, is not configured to spread or to compact the manure evenly onto a compost pile.

U.S. Pat. No. 5,806,685 by Lastinger for CONFINEMENT HOUSE CLEANER which issued on Sep. 15, 1998 teaches a combination scraper, screener, elevator, and hopper which is emptied by a drag chain which pulls the litter along the floor of the hopper and out through a small door in the lower rear portion of the hopper back wall. The cleaner can be pulled by a typical farm tractor. The scraper may be raised or lowered hydraulically. The elevator can be propelled hydraulically or by tractor supplied power take-off. Prior art confinement house cleaners scrape up and carries chicken litter, but does not dump, compact and level the manure, the cleaner drags the manure out of a small opening in the back of the hopper which will cause the manure to be heaped in a narrow pile. The cleaner is not configured to effectively spread or compact the manure onto a compost pile.

An apparatus is needed which will quickly and effectively clean chicken houses and will make composting of chicken manure easy and effective, as well. This apparatus will be capable of being moved onto the top surface of a compost pile, unloading the contents held within and then compressing or compacting the manure that was just delivered onto the top of the compost pile in one fluid motion while leaving the pile ready to receive another load immediately without the need of another apparatus for fragmenting, leveling, removing, transporting, or compacting the litter in a pile which is important to provide efficient composting conditions and minimize the waste storage area.

SUMMARY OF THE INVENTION

Applicant's present invention provides a low profile chicken manure scraper, hauler and compacter which can be pulled by a typical farm tractor through buildings while presenting a low streamlined profile for use in buildings having a standard height ceiling which is important to maintain the desired temperature using an efficient HVAC and/or ventilation system. The scraping depth can be adjusted hydraulically from the tractor, and the manure box can be unloaded hydraulically. The scraper can be pulled forward onto the top of a compost pile or the scraper can be backed up onto the compost pile compacting same whereby the rear surface of the scraper tailgate can extends downward forming a pushing blade for pushing litter. The contents of the container portion of the scraper are unloaded in front of the rear wheels so that as the scraper is moved forward, the tailgate is raised or lowered accordingly to push or level the litter over the pile. As the contents are unloaded, the rear wheels are roll over and compress or compact the new manure onto the compost pile in one fluid motion. The scraper tailgate can be raised or lowered to control how thick the litter is spread over the pile. There is no need to return to the pile with another tractor and leveling blade to spread and compact the manure, as is the case with the cited references. Moreover, location of the rear wheels in the rear of the scraper provides sufficient clearance between the scraper frame and the litter pile to back up an inclined plane such as a mound or pile of litter.

It is an object of this invention to provide a chicken litter scraper, hauler and compacter which can gather chicken litter from the floor of a typical large scale chicken house and leave the floor clean and level.

It is an object of this invention to provide a chicken litter scraper, hauler and compacter which can easily by backed onto a compost pile or can be pulled forward onto a compost pile.

It is an object of this invention to provide a chicken litter scraper, hauler and compacter which is configured to compost chicken litter in one pass over the compost pile, that is, the unloading, spreading and compacting are all done as the scraper is moved forward.

It is an object of this invention to provide a chicken litter scraper, hauler and compacter which spreads and levels the litter as the apparatus is moved forward and can be raised or lowered to control how thick the litter is being spread over the pile.

It is an object of the present invention to be able to hydraulically lift or lower the rear axle and container independently.

It is an object of this invention to provide a chicken litter scraper, hauler and compacter which empties the litter in front of the rear wheels so that as the scraper is moved forward, the rear wheels run over and compress the litter onto a compost pile.

It is an object of this invention to provide a chicken litter scraper, hauler and compacter which be raised or lowered to scrape litter at a selected level on a chicken house floor.

It is an object of this invention to provide a chicken litter scraper, hauler and compacter which can be emptied using hydraulic power which is supplied by a towing vehicle.

It is an object of the present invention to be capable of utilizing a power source selected from a gasoline engine, diesel engine, and/or battery powered motors in combination with a lift system utilizing fluid hydraulics such as a traditional oil system or air hydraulics or electric actuators or a rack and pinion system or belt and pulley system or jacking system to raise and lower the scraper and/or dump the load.

In accordance with the present invention, there is provided a chicken litter scraper, hauler and compacter comprising, consisting essentially of, or consisting of a pivoting container supported by a frame. The scraper frame includes a pair of opposing parallel lateral longitudinal beams connected together at a front distal end by a front longitudinal member or beam extending therebetween. The container defines a box or dump bed having opposing sidewalls and a bed and more particularly opposing lateral walls rigidly connecting to opposing lateral edges of a tiltable base platform defining a bed, and a movable rear wall forming a tailgate. The lateral walls may be bolted to a frame, welded to a frame or formed integrally therewith defining a container frame. A front end rack or plate extends upward from and along the length of the front longitudinal member providing a front end section or front end wall for the container when the container is in the fill or transport position and the base platform forming the scraper is raised generally parallel to the ground.

In one preferred embodiment, the scraper frame includes a first lateral upright frame member is rigidly attached to and extending up from a rearward upper surface of each one of the lateral longitudinal members. A brace is attached to the top of each one of the first lateral upright frame members and extends downwardly at an angle connecting to a medial portion of the lateral longitudinal member. Means for pivoting connects the top rear corner of the container to the top of the first lateral upright frame members. A second pair of lateral upright frame members rigidly attached to and extending up from a rearward upper surface of each one of the lateral longitudinal members. A front longitudinal brace 33 extends between the sidewalls. The scraper frame is supported at a rear end by at least one and preferably two truck assemblies pivotally connected by a pivot arm at a rear lower edge of the scraper frame. A rear lifting means such as one end of a hydraulic cylinder pivotally connects to each one of the trucks and the top portion of the corresponding second pair of lateral upright frame members. A longitudinal planar member extends between each of the pivot arms providing structural support therebetween. Each truck assembly comprises at least one truck frame having at least one axle and means for rolling comprising metal or rubber rollers or tires on wheel rims supported on the axle. As shown in the preferred embodiments, a pair of truck frame disposed on each side of the scraper frame utilizes a pair of wheels (rubber tires on rims). The truck utilizes a pivot leg attaching to the axle at one distal end with the opposing distal end pivotally connected to lugs rigidly attached to a rear surface of the first and second pair of lateral upright frame members on each side of the frame with frame lifting means pivotally connected between the truck and the frame. Means for pivoting the trucks with respect to the scraper frame is provided by a pair of hydraulic cylinders pivotally connected to a top portion of the first and second pair of lateral upright frame members and pivotally connected to a flange or lug extending upward from the base of the truck pivot leg above the axle providing means for lifting and lowering the rear of the scraper independent of the front end of the scraper. The scraper frame also includes a connecting means for connecting the frame to a towing vehicle. The connecting means defines a tongue including a first longitudinal member having one free end rigidly attached to a front surface of the front longitudinal member or beam and extending forward from the front surface of the frame, a hitch means rigidly attached to a second free distal end of the first longitudinal member connects the tongue to the towing vehicle.

In another preferred embodiment, the dump bed container comprises a base platform, two lateral upright sidewalls rigidly secured to opposing lateral edges of the base, a first longitudinal member rigidly connecting an upper rear edge of a first one of the two lateral upright sidewalls to an upper rear edge of a second one of the two lateral upright walls. The second longitudinal member extending distally beyond each of the lateral upright walls and free ends of the second longitudinal member being journalled for rotation on upper free ends of each of the lateral upright frame members, the lateral upright frame members being so positioned as to allow the container to empty the contents in front of the truck as the container is pivoted upward. The container also includes a rear wall forming a tailgate being hingedly attached to the second longitudinal member and capable of being held closed by a locking means against the rear upright edges of the two lateral walls and capable of being released to swing free on the hinged attachment at the upper rear edge of the two lateral walls. Additionally, the container includes container tilting means pivotally connected to the frame and to the container; and a scraper blade attached to a leading edge of the base and canted thereon so that the blade is capable of scraping chicken litter from a chicken house floor and into the container as the container is urged across the floor.

In another embodiment of the present invention, there is provided a chicken litter scraper, hauler and compacter machine consisting essentially of a frame including a front longitudinal member, two lateral longitudinal members, and a rear longitudinal member, the front, rear and two lateral longitudinal members forming a rectangle surrounding a chicken litter container defining a dump bed. The frame also includes a first lateral upright frame member rigidly attached to and extending up from a rearward upper surface of one of the lateral longitudinal members and a second lateral upright frame member rigidly attached to and extending up from a rearward upper surface of the other of the lateral longitudinal members, a first rear upright frame member and a second rear upright frame member rigidly attached to and extending up from an upper surface of the rear longitudinal member. The frame is supported at a rear end by a truck pivotally connected at a rear edge of the frame with frame lifting means pivotally connected between the truck and the frame, the truck comprising a truck frame, at least one axle and at least two wheels, the frame being supported at a rear end by an 'H' shaped truck, two upper free ends of the 'H' shaped truck being pivotally connected to lugs rigidly attached to a rear surface of the frame with frame lifting means pivotally connected between the truck and the frame, at least one axle rigidly attached to two lower free ends of the 'H' shaped truck, and at least two wheels on the at least one axle. The frame also includes a connecting means for connecting the frame to a towing vehicle, the connecting means comprising a first longitudinal member having one free end rigidly attached to a front surface of the frame and extending forward from the front surface of the frame, a hitch means rigidly attached to a second free end of the first longitudinal member for pivotally connecting the chicken litter scraper to the towing vehicle. The container comprises a base platform, two lateral upright walls rigidly secured to opposing lateral edges of the base, a second longitudinal member rigidly connecting an upper rear edge of a first one of the two lateral upright walls to an upper rear edge of a second one of the two lateral upright walls, the second longitudinal member extending distally beyond each of the lateral upright walls and free ends of the second longitudinal member being journalled for rotation on upper free ends of each of the lateral upright frame members, the lateral upright frame members being so positioned as to allow the container to empty the contents in front of the truck as the container is pivoted upward. The container also includes a rear wall forming a tailgate being hingedly attached to the second longitudinal member and capable of being held closed by a locking means against the rear upright edges of the two lateral walls and capable of being released to swing free on the hinged attachment at the upper rear edge of the two lateral walls. Additionally, the container includes container tilting means pivotally connected to the frame and to the container; and a scraper blade attached to a leading edge of the base and canted thereon so that the blade is capable of scraping chicken litter from a chicken house floor and into the container as the container is urged across the floor.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 5:
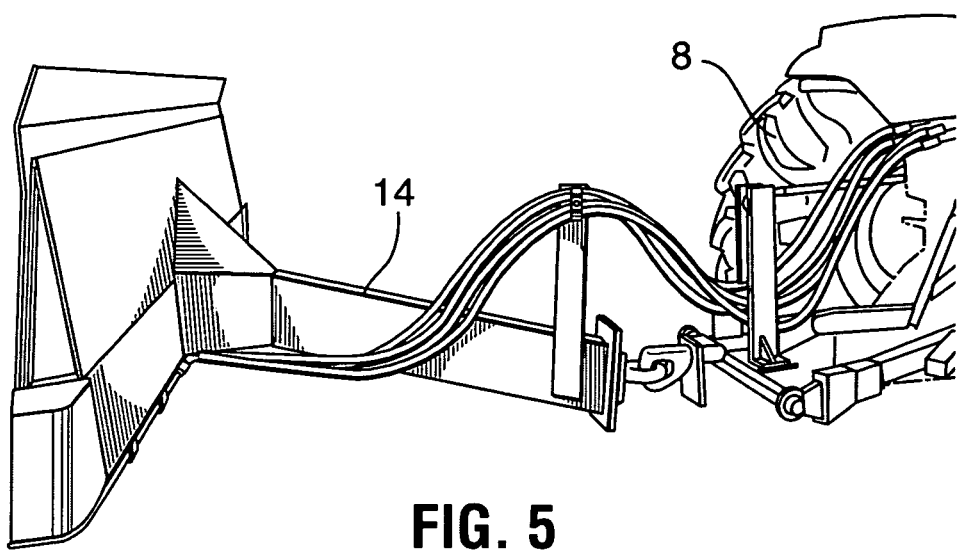
FIG. 5 is a side view of the hitch portion of a chicken litter scraper, hauler and compacter connected to a farm tractor.

In accordance with the present invention, there is provided a chicken litter scraper, hauler and compacter for cleaning and leveling the floor of a large scale chicken house and then removing and composting the litter on a compost pile. The unloading of the litter form the scraper is done in a manner wherein the litter is unloaded, leveled out and compacted onto a compost pile in one fluid motion without the necessity of returning to the pile to FIGS. 1 and 7 show a chicken litter scraper, hauler and compacter 10 including a container defining a dump bed 17 surrounded by and pivotally connected to a frame 12, a tailgate 40 and a truck 20. Frame 12 includes a front longitudinal frame member 121, two lateral longitudinal frame members 122, a rear longitudinal frame member 123, two lateral upright frame members 13 extending upward from the upper surface of the two lateral longitudinal members 122, connecting and towing means 14 and two rear upright frame members 27 extending upward from the upper surface of rear longitudinal member 123. Front longitudinal frame member 121, two lateral longitudinal frame members 122, and rear longitudinal frame member 123 are rigidly connected to form a rectangular shape. In the preferred embodiment, members 121, 122, and 123 may be formed from box metal. Alternate embodiments include these members made from heavy gauge pipe, heavy angle iron, or the like. Towing means includes an approximately horizontal longitudinal member defining a tongue 14 which is rigidly attached to the front surface of front longitudinal member 121, and a towing vehicle connecting member or tongue 141 which pivotally connects frame 12 to a tow vehicle 8 as shown in FIG. 5. The tongue 141 connecting member disposed on the distal end can comprise a pintle hitch, as shown, a standard drawbar hitch requiring a drawbar pin, a ball type hitch or any other appropriate pivoting connecting means.

Figure 2:
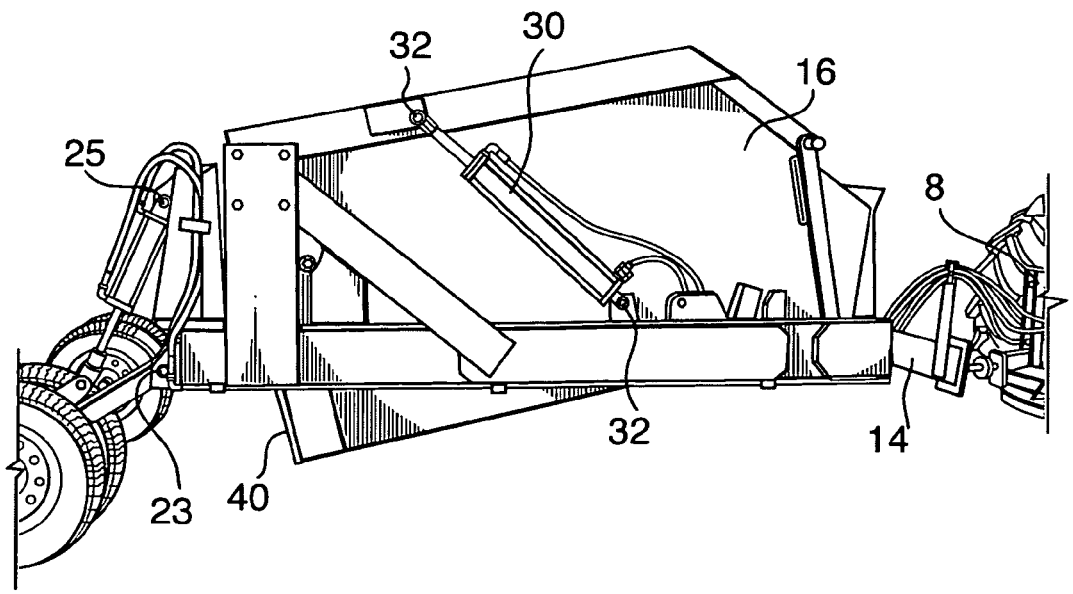
FIG. 2 is a side view of a chicken litter scraper, hauler and compacter in the early stage of preparation for unloading.

Truck 20 is pivotally attached to the rear side of frame 12 by pins 23 at lugs 18 which are rigidly connected to the rear side of frame 12 as shown in FIG. 2. Truck frame 24 is an 'H' shaped frame wherein the upper free ends are pivotally connected to the rear side of frame 12 by pins 23 at lugs 18. Axles 21 are rigidly attached to the lower free ends of 'H' shaped truck frame 24 perpendicular to the lower free ends and coplanar to the 'H'. Wheels 221 are journalled on axles 21 and include pneumatic tires 222. It is anticipated that the tires could be solid or that solid wheels or rollers without tires could be used instead. It is further anticipated that the truck could have more axles and/or more wheels or could have as few as one axle and only two wheels.

The dump bed comprises a container 17 including a base platform 15. The lower edges of left and right lateral side walls 16 are rigidly attached to the lateral edges of base 15. A front end rack or plate 35 extends upward from and along the length of the front longitudinal member providing a front end section or front end wall for the container when the container is in the transport position and the base platform forming the scraper is raised generally parallel to the ground.

Figure 4:
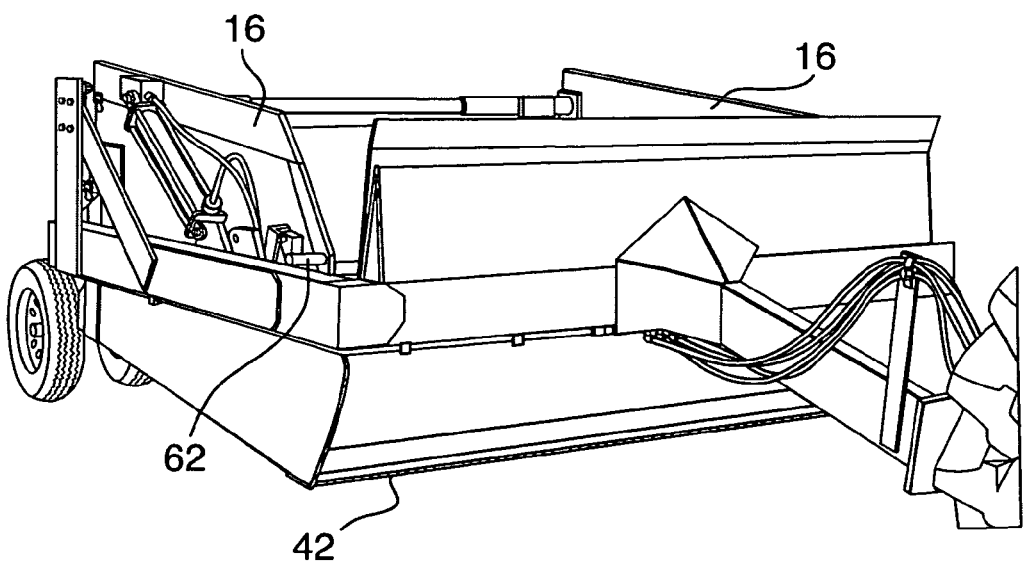
FIG. 4 is a front perspective view of a chicken litter scraper, hauler and compacter preparing to scrape and load.

A scraper blade 42, shown in FIG. 4, is rigidly attached to the leading edge of base 15 so that the sharp edge of blade 42 scrapes and levels the chicken house floor and gathers litter into container 17 as blade 42 is lowered to and urged along the floor.

Figure 7:
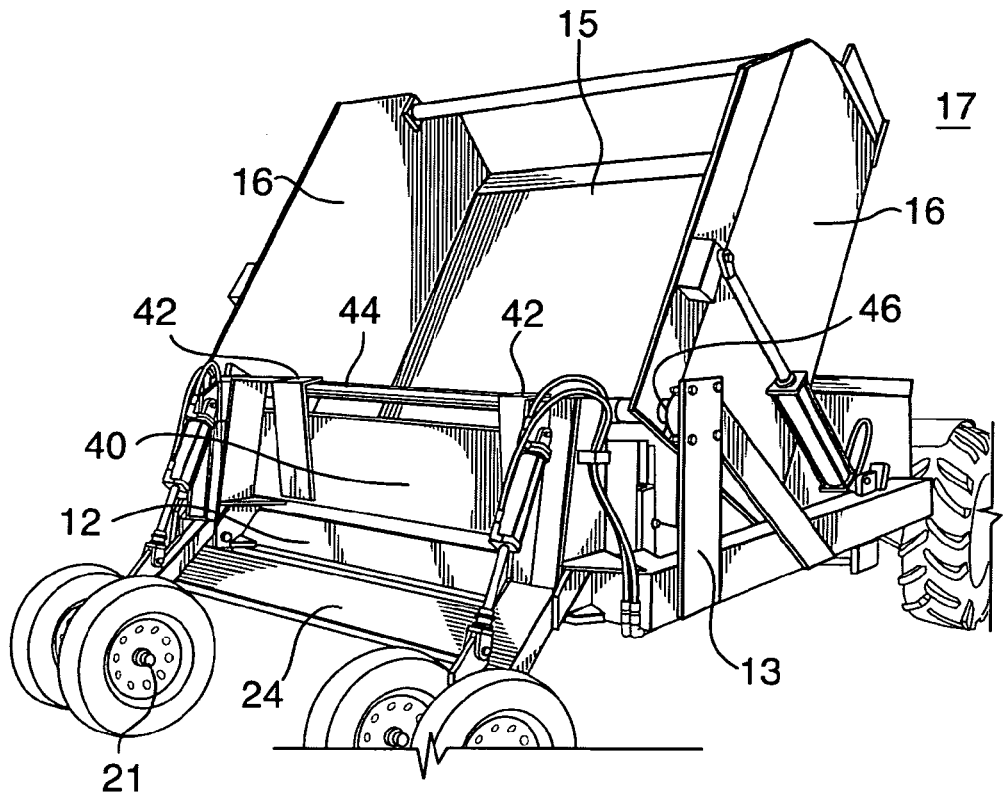
FIG. 7 is a rear view of a chicken litter scraper, hauler and compacter.
Figure 8:
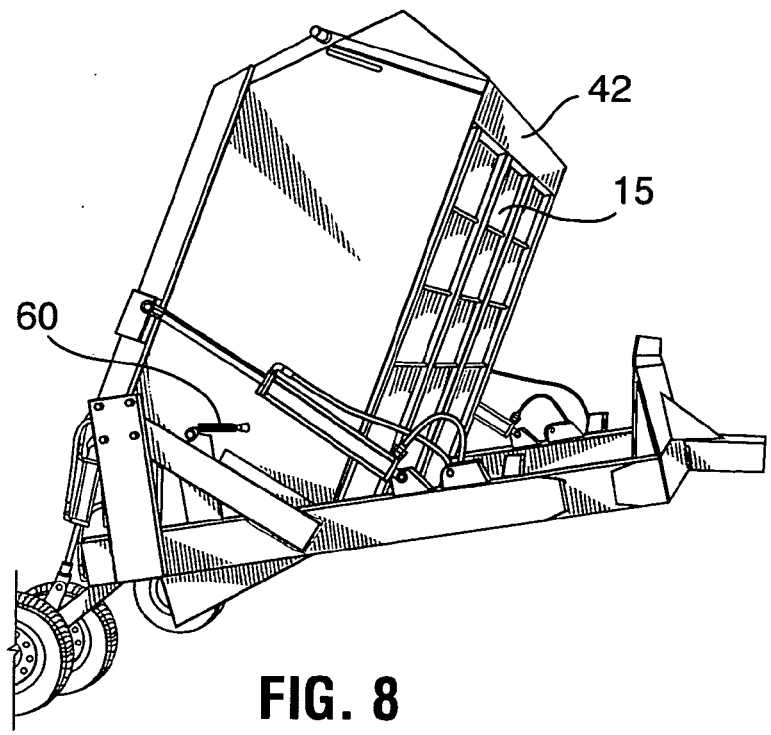
FIG. 8 is a side view of the apparatus with the container tilted into unloading position.

FIG. 7 shows container 17 with a longitudinal member 44 rigidly attached at the upper rear upright edges of lateral walls 16, extending past walls 16 and being journalled on the free upper ends of upright frame portions 13, one on each lateral side of frame 12, by two bearings 46. FIG. 2 shows a tilting means 30 including at least one and preferably a pair of hydraulic cylinders, one on each lateral side of frame 12, whereby one end of the cylinder 30 is pivotally connected to frame 12 and container 17 by pins 32 extending from lugs 67 the top of longitudinal member 122 and with the opposing distal end of the hydraulic cylinder being rigidly attached to frame 12 at lug 68 extending from the upper edge of lateral walls 16. Tilting means 30 can be hydraulic cylinders (as shown), cables and pulleys, gear driven mechanical arms or any reliable means to lift or tilt. As tilting means 30 are extended, container 17 is caused to rotate about bearings 46 and to be tilted to an almost vertical position as shown in FIG. 8.

Figure 6:
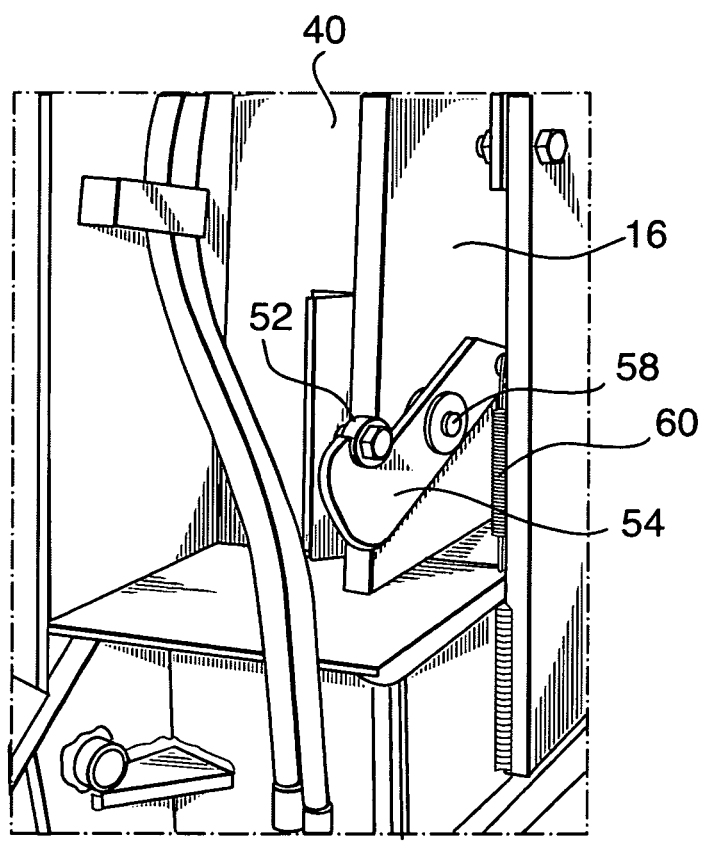
FIG. 6 is a side view of the tailgate locking mechanism.

A tailgate 40 includes two bushings 42 rigidly attached along the upper horizontal edge of tailgate 40 with longitudinal member 44 passing there through, thereby allowing tailgate 40 to open or to close against the rear upright edges of walls 16 and the rear edge of base 15. It is anticipated that more than two bushings can be used. Therefore, fixed longitudinal member 44 and bushings 42 form hinges on which tailgate 40 can swing or rotate thereabout. A pin 53 is rigidly attached to and extends distally from the lower lateral edge of tailgate. Pin 53 is attached parallel to the outer surface of tailgate 40, as shown in FIG. 6. A roller 52 on pin 53 eases the operation of opening and closing the tailgate. It is anticipated that roller 52 may be omitted if desired. A hook member 54 engages roller 52 and pin 53 to hold tailgate 40 closed. Hook 54 pivots on a pin 58 which is rigidly connected near the lower rear upright edge of lateral walls 16 and perpendicular to the outer surface of walls 16. A handle 60 is attached to a free end of hook 54 and can be pulled up to rotate hook 54 on pin 58 to release roller 52 and pin 53 and thereby allow tailgate 40 to open. A hook 54, roller 52 and pin 53 combination may be used on each lower lateral edge of tailgate 40 to provide closing means on both sides of tailgate 40.

When tilting means 30 are extended, container 17 pivots upward due to longitudinal member 44 rotating in bearings 46 which are connected to the upper free ends of lateral upright frame members 13 with four bolts, thereby unloading container 17 if tailgate 40 is open. Lugs 62 are rigidly attached to the upper forward edge of each one of lateral walls 16 and extend distally at right angles to walls 16. When container 17 is tilted down to the loading position, lugs 62 rest on the upper surface of frame 12 to help support the weight of container 17 including any litter held within.

Figure 1:
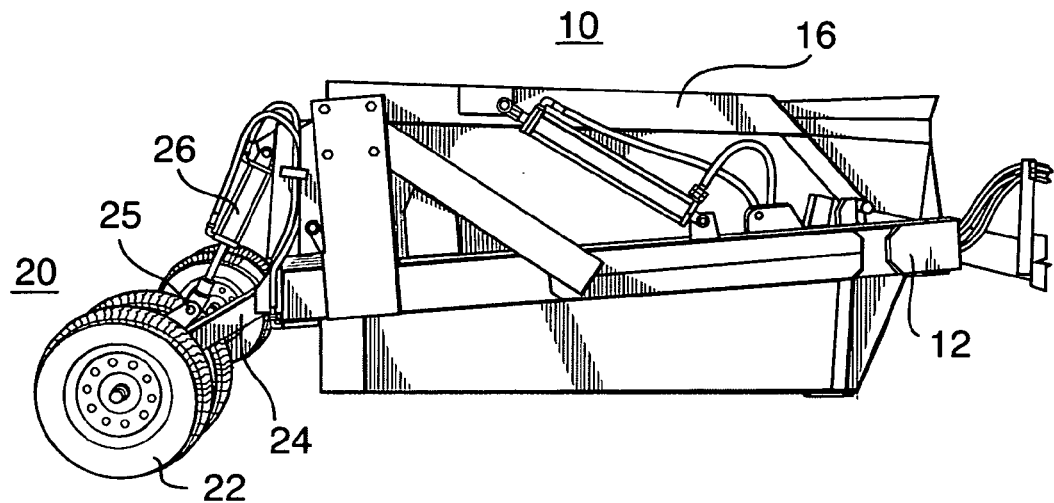
FIG. 1 is a side view of a chicken litter scraper, hauler and compacter configured to transport a load.
Figure 3:
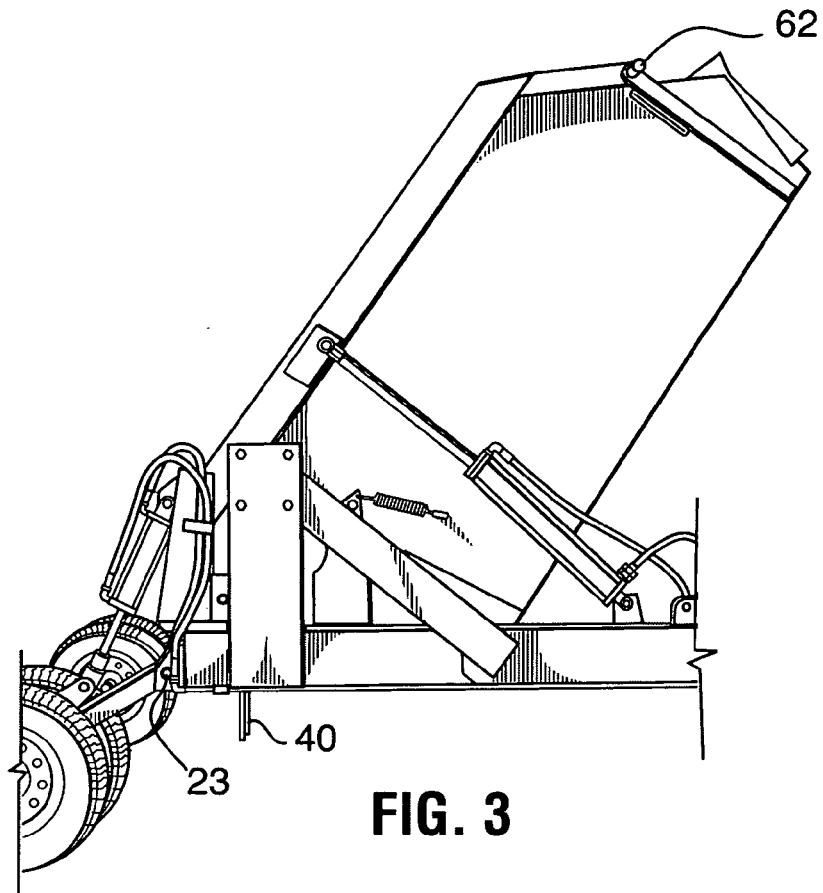
FIG. 3 is a side view of a chicken litter scraper, hauler and compacter configured to unload.

Frame lifting means 26 are pivotally connected to frame 12 and truck 20 by pins 25 at lug 64 which is rigidly attached to truck 12 and lug 65 which is rigidly attached to the upper rear edge of upright frame portion 27, as shown in FIGS. 1 and 6. Lifting means 26 can be extended causing truck 20 to rotate on pins 23, thereby causing frame 12 to lift, and thereby lifting container 17 and tailgate 40, or lifting means 26 can be retracted to lower frame 20, container 17 and tailgate 40. As shown in FIG. 4, with container 17 tilted to the loading position, lifting means 26 can be used to regulate the height of container 17 and therefore blade 42 with respect to a selected scraping level. Conversely, with container 17 tilted to the unloading position and with tailgate 40 open as shown in FIG. 3, lifting means 26 can be used to regulate the height of the bottom edge of tailgate 40 and therefore, the selected thickness at which litter will be spread onto the compost pile. Lifting means 26 and tilting means 30 can each be hydraulic cylinders, cables and pulleys, gear driven mechanical arms or any reliable means to lift or tilt.

The preferred embodiment of the present invention includes a rectangular frame 12. Alternate embodiments contain a roughly oval or elliptical frame, instead.

The preferred embodiment uses hydraulic power supplied by the towing vehicle. An alternate embodiment provides an electrically powered air or fluid hydraulic pump unit carried on scraper 10.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

We claim:
1. A chicken litter scraper, hauler and compacter comprising:
a frame including a front longitudinal member, a first lateral longitudinal member, a second lateral longitudinal member, and a rear longitudinal member forming a rectangle surrounding a chicken litter container;
a first lateral upright frame member rigidly attached to and extending up from a rearward upper surface of said first lateral longitudinal member and a second lateral upright frame member rigidly attached to and extending up from a rearward upper surface of said second lateral longitudinal members;
a first rear upright frame member and a second rear upright frame member rigidly attached to and extending up from an upper surface of said rear longitudinal member;
a pair of trucks each one comprising a truck frame including at least one axle and at least one wheel, an upper free end of said truck frame being pivotally connected to at least one lugs rigidly attached to a rear surface of said frame;
frame lifting means pivotally connected between each one of said trucks and said frame;
said frame including a connecting means for connecting said frame to a towing vehicle;
said container comprising a base platform, a pair of opposing lateral upright walls rigidly secured to opposing lateral edges of said base, a second longitudinal member rigidly connecting an upper rear edge of a first one of said pair of opposing lateral upright walls to an upper rear edge of a second one of said opposing lateral upright walls, said second longitudinal member extending distally beyond each of said lateral upright walls and free ends of said second longitudinal member being journalled for rotation on upper free ends of each of said lateral upright frame members, said lateral upright frame members being so positioned as to allow said container to empty contents held within in front of said trucks as said container is pivoted upward, a rear wall forming a tailgate, said tailgate being hingedly attached to said second longitudinal member and capable of being held closed by a locking means against said rear upright edges of said two lateral walls and capable of being released to swing free on said hinged attachment at said upper rear edge of said two lateral walls;
container tilting means pivotally connecting to said frame and to said container; and
a scraper blade attached to a leading edge of said base and canted thereon so that said blade is capable of scraping chicken litter from a chicken house floor and into said container as said container is urged across said floor.

2. The scraper, hauler and compacter defined in claim 1 wherein said front, rear and two lateral longitudinal members forming a rectangle are formed from box metal.

3. The scraper, hauler and compacter defined in claim 1 wherein said container tilting means comprise hydraulic cylinders.

4. The scraper, hauler and compacter defined in claim 3 wherein said frame lifting means comprise hydraulic cylinders.

5. The scraper, hauler and compacter defined in claim 1 wherein said tailgate locking means comprises a pin extending distally from a bottom edge of said tailgate and parallel to an outer surface of said tailgate and a pin engaging hook member pivotally attached to a lower portion of said rear upright edge of said lateral walls.

6. The scraper, hauler and compacter of claim 1, said connecting means comprising a first longitudinal member having one free end rigidly attached to a front surface of said frame and extending forward from said front surface of said frame.

7. The scraper, hauler and compacter of claim 1, wherein said connecting means includes hitch means rigidly attached to a second free end of said first longitudinal member for pivotally connecting said chicken litter scraper to said towing vehicle.

8. A scraper, hauler and compacter consisting essentially of:
- a frame including a front longitudinal member, a first lateral longitudinal member, a second lateral longitudinal member, and a rear longitudinal member forming a rectangle surrounding a chicken litter container;
- a first lateral upright frame member rigidly attached to and extending up from a rearward upper surface of said first lateral longitudinal member and a second lateral upright frame member rigidly attached to and extending up from a rearward upper surface of said second lateral longitudinal members;
- a first rear upright frame member and a second rear upright frame member rigidly attached to and extending up from an upper surface of said rear longitudinal member;
- a pair of trucks each one comprising a truck frame including at least one axle and at least one wheel, an upper free end of said truck frame being pivotally connected to at least one lugs rigidly attached to a rear surface of said frame;
- frame lifting means pivotally connected between each one of said trucks and said frame;
- said frame including a connecting means for connecting said frame to a towing vehicle;
- said container comprising a base platform, a pair of opposing lateral upright walls rigidly secured to opposing lateral edges of said base, a second longitudinal member rigidly connecting an upper rear edge of a first one of said pair of opposing lateral upright walls to an upper rear edge of a second one of said opposing lateral upright walls, said second longitudinal member extending distally beyond each of said lateral upright walls and free ends of said second longitudinal member being journalled for rotation on upper free ends of each of said lateral upright frame members, said lateral upright frame members being so positioned as to allow said container to empty contents held within in front of said trucks as said container is pivoted upward, a rear wall forming a tailgate, said tailgate being hingedly attached to said second longitudinal member and capable of being held closed by a locking means against said rear upright edges of said two lateral walls and capable of being released to swing free on said hinged attachment at said upper rear edge of said two lateral walls;
- container tilting means pivotally connecting to said frame and to said container; and
- a scraper blade attached to a leading edge of said base and canted thereon so that said blade is capable of scraping chicken litter from a chicken house floor and into said container as said container is urged across said floor.

9. The scraper, hauler and compacter defined in claim 8 wherein said tailgate locking means comprises a pin extending distally from a bottom edge of said tailgate and parallel to an outer surface of said tailgate and a pin engaging hook member pivotally attached to a lower portion of said rear upright edge of said lateral walls.

10. The scraper, hauler and compacter of claim 8, wherein said frame comprises an 'H' shaped truck with an upper free end of said 'H' shaped truck pivotally connecting to lugs rigidly attached to a rear surface of said frame.

11. The scraper, hauler and compacter of claim 8, said connecting means comprising a first longitudinal member having one free end rigidly attached to a front surface of said frame and extending forward from said front surface of said frame.

12. The scraper, hauler and compacter of claim 11, wherein said connecting means includes hitch means rigidly attached to a second free end of said first longitudinal member for pivotally connecting said chicken litter scraper to said towing vehicle.

13. The scraper, hauler and compacter defined in claim 8, wherein said container tilting means and said frame lifting means comprise hydraulic cylinders connecting to a hydraulic power source.

14. A scraper, hauler and compacter comprising:
- a generally rectangular frame surrounding a container;
- a first rear upright frame member and a second rear upright frame member rigidly attached to and extending up from an upper surface of a rear longitudinal member;
- at least one truck including a truck frame having an upper free end pivotally connecting to at least one lug rigidly attached to a rear surface of said frame;
- frame lifting means pivotally connected between said at least one truck and said frame;
- said frame including a connecting means for connecting said frame to a towing vehicle;
- said container comprising a base platform, a pair of opposing lateral upright walls rigidly secured to opposing lateral edges of said base, a second longitudinal member rigidly connecting an upper rear edge of a first one of said pair of opposing lateral upright walls to an upper rear edge of a second one of said opposing lateral upright walls, said second longitudinal member extending distally beyond each of said lateral upright walls and free ends of said second longitudinal member being journalled for rotation on upper free ends of each of said lateral upright frame members, said lateral upright frame members being so positioned as to allow said container to empty contents as said container is pivoted upward;
- said container including a rear wall forming a tailgate, said tailgate being hingedly attached to said second longitudinal member and capable of being held closed by a locking means against said rear upright edges of said two lateral walls and capable of being released to swing on said hinged attachment at said upper rear edge of said two lateral walls;
- container tilting means pivotally connecting to said frame and to said container; and
- a scraper blade attached to a leading edge of said base and canted thereon so that said blade is capable of scraping chicken litter from a chicken house floor and into said container as said container is urged across said floor.

15. The scraper, hauler and compacter defined in claim 14 wherein said container tilting means comprise hydraulic cylinders.

16. The scraper, hauler and compacter defined in claim 14 wherein said frame lifting means comprise hydraulic cylinders.

17. The scraper, hauler and compacter of claim 14, wherein said connecting means includes hitch means rigidly attached to a second free end of said first longitudinal member for pivotally connecting said chicken litter scraper to said towing vehicle.

18. The scraper, hauler and compacter of claim 14, wherein said each truck comprises a truck frame including at least one axle and at least one wheel, an upper free end of said truck frame being pivotally connected to at least one lugs rigidly attached to a rear surface of said frame.

19. The scraper, hauler and compacter of claim 14, wherein said each truck comprises a truck frame including at least one axle and a pair of wheels, an upper free end of said truck frame being pivotally connected to a pair of lugs rigidly attached to a rear surface of said frame.

\* \* \* \* \*